(12) United States Patent
Gong et al.

(10) Patent No.: US 12,423,561 B2
(45) Date of Patent: Sep. 23, 2025

(54) METHOD AND APPARATUS FOR KEEPING STATISTICAL INFERENCE ACCURACY WITH 8-BIT WINOGRAD CONVOLUTION

(71) Applicant: INTEL CORPORATION, Santa Clara, CA (US)

(72) Inventors: Jiong Gong, Shanghai (CN); Haihao Shen, Shanghai (CN); Xiao Dong Lin, Shanghai (CN); Xiaoli Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1266 days.

(21) Appl. No.: 17/041,336

(22) PCT Filed: Jul. 30, 2018

(86) PCT No.: PCT/CN2018/097730
§ 371 (c)(1),
(2) Date: Sep. 24, 2020

(87) PCT Pub. No.: WO2020/024093
PCT Pub. Date: Feb. 6, 2020

(65) Prior Publication Data
US 2021/0350210 A1 Nov. 11, 2021

(51) Int. Cl.
*G06N 3/02* (2006.01)
*G06F 7/483* (2006.01)
(Continued)

(52) U.S. Cl.
CPC ............ *G06N 3/045* (2023.01); *G06F 7/483* (2013.01); *G06F 17/16* (2013.01); *G06N 3/063* (2013.01); *G06N 3/08* (2013.01)

(58) Field of Classification Search
CPC ............ G06N 3/02; G06N 3/04; G06N 3/045; G06N 3/0464; G06N 3/048; G06N 3/06;
(Continued)

(56) References Cited

U.S. PATENT DOCUMENTS 5,027,201 A * 6/1991 Bernard ................. H04N 5/144
348/E7.012
5,664,095 A * 9/1997 Cox ....................... G06F 11/076
714/704
(Continued)

FOREIGN PATENT DOCUMENTS

CN 105389596 A 3/2016
CN 106384098 A 2/2017
(Continued)

OTHER PUBLICATIONS

Shenzhen, CN108053028A, May 18, 2018, Google Patents translation, printout pp. 1-13 (Year: 2018).*
(Continued)

*Primary Examiner* — Tamara T Kyle
*Assistant Examiner* — William Wong
(74) *Attorney, Agent, or Firm* — Akona IP PC

(57) ABSTRACT

A method and apparatus for keeping statistical inference accuracy with 8-bit winograd convolution. A calibration dataset and a pretrained CNN comprising 32-bit floating point weight values may be sampled to generate an input activation tensor and a weight tensor. A transformed input activation tensor may be generated by multiplying the input activation tensor and an input matrix to generate a transformed input activation tensor. A transformed weight tensor may be generated by multiplying the weight tensor and a weight matrix. A scale factor may be computed for each transformed tensor. An 8-bit CNN model including the scale factors may be generated.

25 Claims, 8 Drawing Sheets

(51) Int. Cl.
*G06F 17/16* (2006.01)
*G06N 3/045* (2023.01)
*G06N 3/063* (2023.01)
*G06N 3/08* (2023.01)

(58) Field of Classification Search
CPC ........ G06N 3/063; G06N 3/065; G06N 3/067; G06N 3/08; G06F 17/16; G06F 7/483
See application file for complete search history.

(56) References Cited

U.S. PATENT DOCUMENTS

| | | | | |
|---|---|---|---|---|
| 9,025,658 | B2* | 5/2015 | Wang | H04N 19/42 375/240.18 |
| 10,467,729 | B1* | 11/2019 | Perera | G06T 3/4046 |
| 2017/0344876 | A1* | 11/2017 | Brothers | G06N 3/082 |
| 2017/0372202 | A1* | 12/2017 | Ginsburg | G06N 3/045 |
| 2018/0018556 | A1* | 1/2018 | Young | G06N 3/045 |
| 2018/0046894 | A1* | 2/2018 | Yao | G06N 3/045 |
| 2018/0101752 | A1 | 4/2018 | Chen et al. | |
| 2018/0189237 | A1 | 7/2018 | Werner et al. | |
| 2019/0012559 | A1* | 1/2019 | Desappan | G06V 10/764 |
| 2019/0042935 | A1* | 2/2019 | Deisher | G06F 5/01 |
| 2019/0042945 | A1* | 2/2019 | Majumdar | G06N 3/045 |
| 2019/0243610 | A1* | 8/2019 | Lin | G06N 3/08 |

FOREIGN PATENT DOCUMENTS

| | | |
|---|---|---|
| CN | 106529447 A | 3/2017 |
| CN | 108053028 A | 5/2018 |
| JP | 2018010618 A | 1/2018 |
| JP | 2018110440 A | 7/2018 |

OTHER PUBLICATIONS

International Search Report and Written Opinion for the Application No. PCT/CN2018097730, mailed Apr. 28, 2019, 8 pages.

* cited by examiner

METHOD AND APPARATUS FOR KEEPING STATISTICAL INFERENCE ACCURACY WITH 8-BIT WINOGRAD CONVOLUTION

CROSS-REFERENCE TO RELATED APPLICATION

This application is a national stage application claiming the benefit of and priority to International Application No. PCT/CN2018/097730 entitled "METHOD AND APPARATUS FOR KEEPING STATISTICAL INFERENCE ACCURACY WITH 8-BIT WINOGRAD CONVOLUTION" filed Jul. 30, 2018, which is hereby incorporated by reference in its entirety.

TECHNICAL FIELD

Embodiments described herein relate to the field of neural networks. More specifically, the embodiments relate to methods and apparatuses for keeping statistical inference accuracy with 8-bit Winograd convolution.

BACKGROUND

Deep neural networks (DNNs) are tools for solving complex problems across a wide range of domains such as computer vision, image recognition, speech processing, natural language processing, language translation, and autonomous vehicles. One example of a DNN is a convolutional neural network (CNN). However, challenges remain during industrial deployment of DNNs due to the complexity of computational operations performed by the DNNs. Enabling low precision inference is one approach to reducing the computational complexity of DNNs. Low precision may generally refer to using data types having lower bit widths, such as 8-bit integers (or INT8), rather than data types having larger bit widths, such as 32-bit floating point values (or FP32). With hardware acceleration, low precision (e.g., INT8) inference operations can compute more operations per second, reduce memory access pressure, better utilize memory caches, and deliver higher throughput and lower latency. This calls for innovations in numerical representations and operations specifically tailored for deep learning needs.

Convolution is a computation-intensive operation for DNN models. Recently, INT8 inference has been implemented for convolution without significant accuracy loss relative to FP32-based operations. The Coppersmith-Winograd ("CW", also referred to as "Winograd") algorithm provides faster convolution computation by leveraging memory to reduce the required computation. However, the CW algorithm is limited to 32-bit floating point training and inference operations, and has not been successfully applied in INT8 settings. Successfully merging the CW algorithm and INT8 computation would provide improved system performance in convolution computation operations.

DETAILED DESCRIPTION

Figure 1:
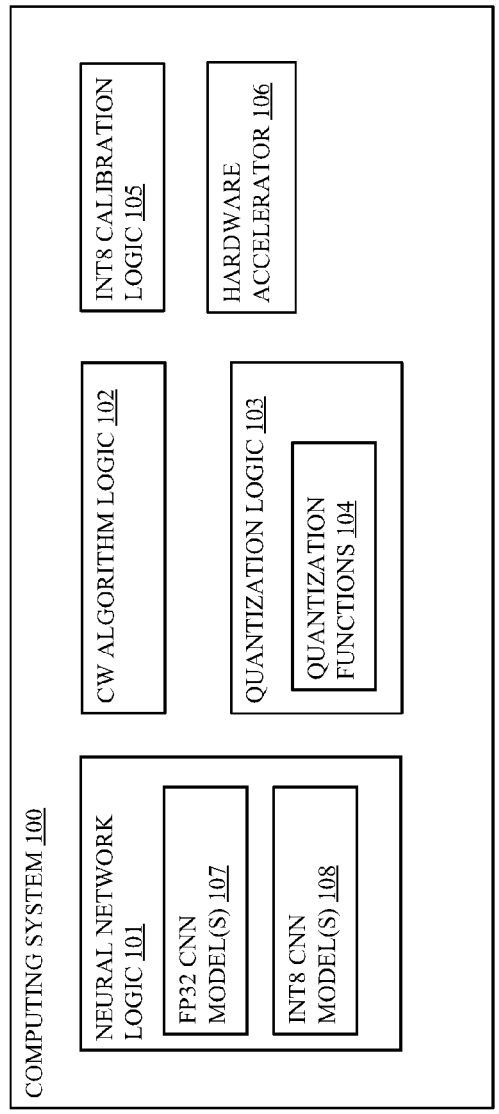
FIG. 1 illustrates an embodiment of a system.

Embodiments disclosed herein provide a framework to perform Coppersmith-Winograd convolution using 8-bit integer (or "INT8") data types. Conventionally, versions of the CW algorithm have been limited to processing FP32 data types. Generally, the CW algorithm requires transformation of the activation tensor (also referred to as a feature tensor) and the weight tensor using constant matrices. However, such a transformation changes the data distributions of the tensors. As such, the existing approaches to INT8 convolution cannot apply to the CW algorithm, as one or more scale factors used in the CW algorithm cannot be used for INT8 operations. Furthermore, conversions from FP32 to INT8 may result in a significant loss of accuracy provided by FP32 implementations. For example, unsigned INT8 values may range from 0-255 (with no decimal points of precision available), while FP32 values may range from $3.4 \times 10^{-38}$ to $3.4 \times 10^{38}$ (with up to seven decimal points of precision). Advantageously, embodiments provide a calibration approach for determining scale factors such that the CW algorithm can be applied to INT8 settings without significant accuracy loss relative to FP32 implementations.

Generally, embodiments disclosed herein sample a pretrained CNN with FP32 values and a FP32 calibration dataset to generate an input activation tensor and a weight tensor. The input activation tensor and weight tensor may be modified to generate a transformed input activation tensor and transformed weight tensor, respectively. The transformed input activation tensor and the transformed weight tensor may then be used to generate respective scale factors for the transformed input activation tensor and transformed weight tensor. An 8-bit (or INT8) optimized CNN model may then be generated that includes the scale factors. The 8-bit optimized CNN model may then be used to perform INT8 CW convolution using one or more quantization and/or dequantization functions without significant accuracy loss relative to FP32 implementations.

Advantageously, the 8-bit optimized CNN model is generated based on the FP32 CNN model without needing to fine-tune or retrain the 8-bit optimized CNN model. In at least one embodiment, a hardware accelerator may perform the INT8 CW convolution. Processing data using the CW algorithm in an INT8 setting provides substantial improvements in hardware footprint, power consumption, speed, and memory requirements. Similarly, when the hardware accelerator performs the INT8 CW convolution, the processing performance is improved relative to conventional hardware and/or software implementations.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a computing system 100. The system 100 is representative of any number and type of computing system, such as a server, workstation, laptop, or virtualized computing system. For example, the system 100 may be an embedded system such as a deep learning accelerator card, a processor with deep learning acceleration, a neural compute stick, or the like. In some examples, the system 100 comprises a System on a Chip (SoC) and, in other embodiments, the system 100 includes a printed circuit board or a chip package with two or more discrete components. As shown, the computing system 100 includes a neural network logic 101, a CW algorithm logic 102, a quantization logic 103, an INT8 calibration logic 105, and an 8-bit hardware accelerator 106.

The neural network logic 101 is representative of hardware, software, and/or a combination thereof, which may comprise a neural network (e.g., a DNN, a CNN, etc.) that implements dynamic programing to determine and solve for an approximated value function. In at least one embodiment, the neural network logic 101 comprises a CNN, which is formed of a cascade of multiple layers of nonlinear processing units for feature extraction and transformation. Each successive layer of the CNN uses the output from the previous layer as input. The CNN may generally include an input layer, an output layer, and multiple hidden layers. The hidden layers of a CNN may include convolutional layers, pooling layers, fully connected layers, and/or normalization layers.

Generally, a neural network includes two processing phases, a training phase and an inference phase. During training, a deep learning expert will typically architect the network, establishing the number of layers in the neural network, the operation performed by each layer, and the connectivity between layers. Many layers have parameters, typically filter weights, that determine exact computation performed by the layer. The objective of the training process is to learn the filter weights, usually via a stochastic gradient descent-based excursion through the space of weights. The training phase generates an output feature map, also referred to as an activation tensor. An activation tensor may be generated for each convolutional layer of the CNN of the neural network logic 101. The output feature map of a given convolutional layer may be the input to the next convolutional layer. Once the training process is complete, inference based on the trained neural network (e.g., the FP32 CNN model(s) 107 and/or the INT8 CNN model(s) 108) typically employs a forward-propagation calculation for input data to generate output data.

For example, the computing system 100 may provide the neural network logic 101 with cascaded stages for face detection, character recognition, speech recognition, or the like. The neural network logic 101 may then perform training based on an input dataset (e.g., images of faces, handwriting, printed information, etc.) that is in the form of tensor data. A tensor is a geometric object that describes linear relations between geometric vectors, scalars, and other tensors. An organized multidimensional array of numerical values, or tensor data, may represent a tensor. The training may produce refined weights for the neural network logic 101. For example, the refined weights may specify features that are characteristic of numerals and/or each letter in the English alphabet. During the inference phase, the neural network logic 101 may receive images as input, and perform desired processing on the input images. For example, the input images may depict handwriting, and the trained neural network logic 101 may identify numerals and/or letters of the English alphabet included in the handwriting. In at least one embodiment, the hardware accelerator 106 performs the INT8 inference operation.

The CW algorithm logic 102 is hardware, software, and/or a combination thereof that implements one or more versions of the CW algorithm. The CW algorithm is a matrix multiplication algorithm that uses arithmetic projections, which may perform matrix multiplication (and therefore CNN convolutions) faster than conventional algorithms. Generally, the CW algorithm operates on small tiles of an input image, where the input tile and weight filter are transformed, the outputs of the transformation are multiplied together in an element-wise fashion, and the result is transformed back to obtain the outputs of the convolution. Conventionally, however, the CW algorithm logic 102 is limited to operating on 32-bit floating point values, such as the FP32 model(s) 107 and associated data of the neural network logic 101.

Advantageously, however, embodiments disclosed herein allow the CW algorithm logic 102 to process the 8-bit integer values, such as the INT8 CNN models 108 and associated data of the neural network logic 101. To do so, embodiments disclosed herein leverage the quantization functions 104 of the quantization logic 103 and the INT8 calibration logic. The quantization logic 103 is generally configured to apply the quantization functions 104 to transform FP32 values to INT8 values, and to transform INT8 values to FP32 values. Equation 1 below shows an example quantization function 104 $Q: R^n \times R \times N \rightarrow z^n \times R$ to transform an n-dimensional (where n is an positive integer) rational tensor r (e.g., an FP32 tensor) into an n-dimensional rational tensor z (e.g., an INT8 tensor) with a scale factor q and bit-precision p:

$$Q(r,q,p)=Q_p(r,q)=Q_{p,q}(r)=(z,q)z=\max(\min(\text{Round}(qr), 2^p-1),-2^p),$$

where $r \in R^n, q \in R, p \in N^+, z \in Z^n$, Round: $R^n \rightarrow Z^n$     (Equation 1)

In equation 1, the function Round is a rounding function that approximates a rational tensor (e.g., an FP32 tensor) with an integer tensor (e.g., an INT8 tensor). The quantization functions 104 also include one or more de-quantization functions to transform INT8 values to FP32 values. Equation 2 below is an example de-quantization function 104 D: $Z^n \times R \rightarrow R^n$:

$$D(z, q) = D_q(z) = \frac{z}{q} = r' \approx r \quad \text{(Equation 2)}$$

As shown, Equation 2 approximates the rational tensor r with its quantized form z. The quantization functions 104 may also include functions for performing arithmetic operations on (z, q), including addition and multiplication operations for the tensors r and z. Equation 3 depicts an example addition operation for (z, q):

$$(z_1,q_1)+(z_2,q_2)=Q_p(D_{q1}(z_1)+D_{q2}(z_2),\min(q_1,q_2)) \quad \text{(Equation 3)}$$

As shown, the addition operation of Equation 3 leverages Equation 1 to dequantize the INT8 integers in tensor z to FP32, and the addition operation is performed on the dequantized FP32 values. The result of the FP32 addition operation is then quantized using Equation 2. By implementing the minimum function, Equation 3 ensures that there are no bit overflows. Equation 4 depicts an example multiplication operation for (z, q):

$$(z_1,q_1) \times (z_2,q_2)=(z_1 \times z_2, q_1 q_2) \quad \text{(Equation 4)}$$

When applying the multiplication function defined in Equation 4 (e.g., multiplying the tensors and the scale factors), the data ranges may change. As such, a scale factor is required to account for the transformation. In one embodiment, the INT8 calibration logic 105 generates the required scale factor for the activation tensor and the scale factor of the weight tensor required to perform the processing of INT8 data by the CW algorithm logic 102.

In one embodiment, the quantization functions 104 implement a maximum calibration strategy to determine scale factors for 8-bit CW convolution. However, other calibration strategies may be used, such as a minimum calibration strategy. Generally, in the maximum calibration strategy, the maximum value in an activation tensor is identified and the maximum value in a weight tensor is identified. The quantization functions 104 may then define the scale factor with precision p using the following Equation 5:

$$\frac{2^p - 1}{\max} \quad \text{(Equation 5)}$$

Figure 2:
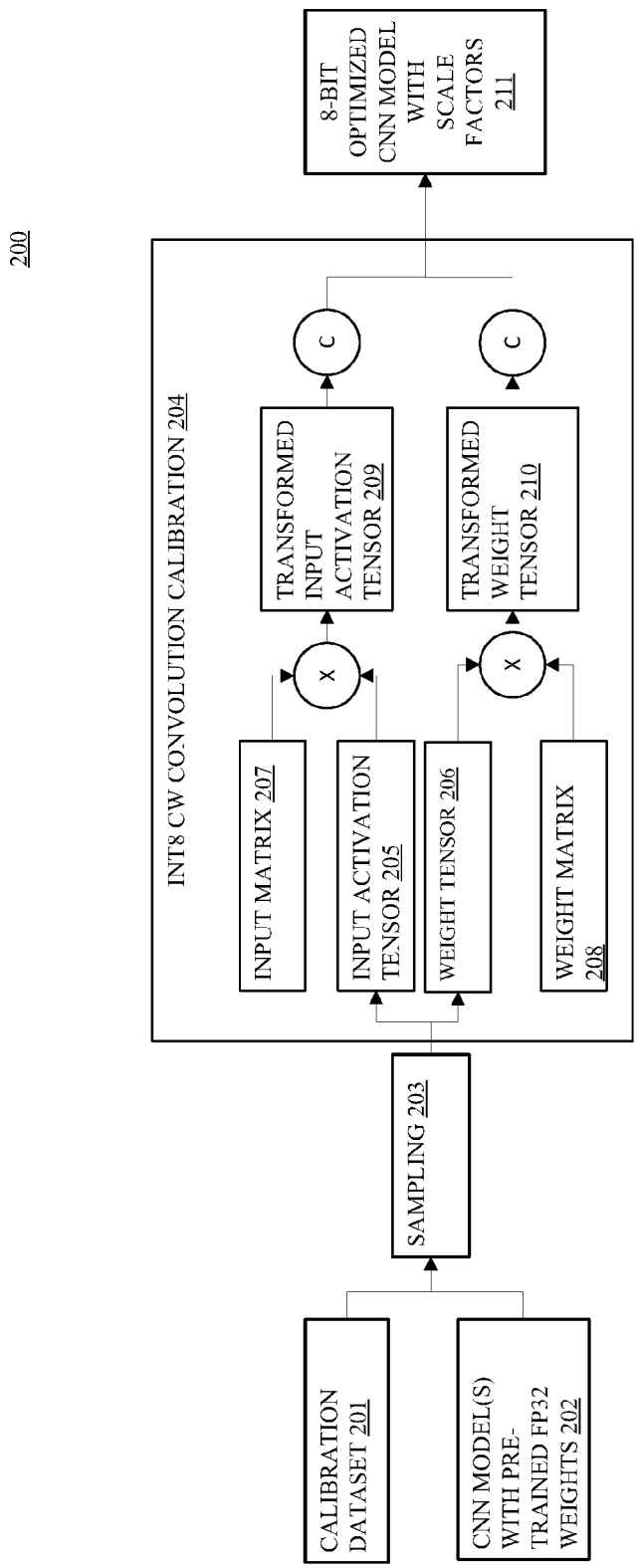
FIG. 2 illustrates an embodiment of an example processing flow.

In one embodiment, p=8 for the activation tensor, as the activation tensors include non-negative values. Therefore, for activation tensors, the scale factor may be defined as $$\frac{255}{\max},$$

where max is the maximum value stored in the activation tensor. In one embodiment, the p=7 for weight tensors (which may or may not include negative values, and therefore a bit needs to be reserved to indicate sign). Therefore, for the weight tensors, the scale factor may be defined as $$\frac{127}{\max},$$

where max is the maximum value in the given weight tensor. The INT8 calibration logic 105 is further is configured to apply the quantization functions 104 (e.g., Equations 1-5 above) to allow the CW algorithm logic 102 to compute the convolution of INT8 values (e.g., the INT8 CNN models 108) without losing precision and/or accuracy due to the conversion from FP32 to INT8 values. Further details are now explained with reference to FIG. 2, which depicts an example processing flow 200 for calibrating INT8 CW convolution.

As shown, the processing flow 200 includes a calibration dataset 201 and one or more CNN models with pre-trained FP32 weights 202. The calibration dataset 201 may be any type of dataset, such as a dataset of images. The CNN models with pre-trained FP32 weights 202 are representative of FP32 CNN models 107 that have been generated by a CNN (e.g., the neural network logic 101, or a different CNN) based on FP32 data, and include FP32 weight values. The CNN models with pre-trained FP32 weights 202 may therefore include FP32 weight tensor values, FP32 activation tensor values, FP32 bias tensor values, as well as other types of FP32 data.

In the processing flow 200, the INT8 calibration logic 105 may then initiate sampling block 203. Generally, the sampling 203 is a simulation of an inference operation performed by the neural network logic 101 on the calibration dataset 201 and the CNN model with pre-trained FP32 weights 202. The simulation 203 generates tensors for each convolutional layer of the CNN model with pre-trained FP32 weights 202. The generated tensors may include an input activation tensor 205 and a weight tensor 206 for each convolutional layer. Generally, the sampling 203 of a given image in the calibration dataset 201 may produce a first data range for the convolutional layer (e.g., the data ranges of the input activation tensor 205 and the weight tensor 206. However, the sampling 203 of different images may produce different data ranges. Therefore, the sampling 203 of all images in the calibration dataset 201 merges all data ranges for the calibration dataset 201.

The processing flow 200 further includes an INT8 CW convolution calibration phase 204. In the calibration phase 204, the INT8 calibration logic 105 (or another designated system component) may perform matrix multiplication of the input activation tensor 205 and an input matrix 207. The input matrix 207 may be a matrix storing constant values. The output of the multiplication operation between the input activation tensor 205 and the input matrix 207 is the transformed input activation tensor 209. Similarly, in the calibration phase 204, the INT8 calibration logic 105 may perform matrix multiplication on the weight tensor 206 and a weight matrix 208. The weight matrix 208 may store constant values. The output of the multiplication operation between the weight tensor 206 and the weight matrix 208 is the transformed weight tensor 210.

For an example CW algorithm F(2,3), an example input matrix 207 is given as matrix B (and corresponding transposed matrix $B^T$) in Equation 6:

$$B = \begin{bmatrix} 1 & 0 & 0 & 0 \\ 0 & 1 & -1 & 1 \\ -1 & 1 & 1 & 0 \\ 0 & 0 & 0 & 1 \end{bmatrix}, \quad B^T = \begin{bmatrix} 1 & 0 & -1 & 0 \\ 0 & 1 & 1 & 1 \\ 0 & -1 & 1 & 0 \\ 0 & 1 & 0 & -1 \end{bmatrix} \quad \text{(Equation 6)}$$

Although the F(2,3) CW algorithm is used as an example herein, the techniques of the disclosure apply equally to all implementations of the CW algorithm. An example weight matrix 208 is given as matrix G (and corresponding transposed matrix $G^T$) in Equation 7:

$$G = \begin{bmatrix} 1 & 0 & 0 \\ \frac{1}{2} & \frac{1}{2} & \frac{1}{2} \\ \frac{1}{2} & -\frac{1}{2} & \frac{1}{2} \\ 0 & 0 & 1 \end{bmatrix}, \quad G^T = \begin{bmatrix} 1 & \frac{1}{2} & \frac{1}{2} & 0 \\ 0 & \frac{1}{2} & -\frac{1}{2} & 0 \\ 0 & \frac{1}{2} & \frac{1}{2} & 1 \end{bmatrix} \quad \text{(Equation 7)}$$

The transformed input activation tensor 209 and the transformed weight tensor 210 may then be calibrated using the following Equations 8-11:

$$x_a = B^T x_b B \quad \text{(Equation 8)}$$

$$q_{x_a} = q_{x_b} \times \frac{\max_{x_b}}{\max_{x_a}} \quad \text{(Equation 9)}$$

$$w_a = G w_b G^T \quad \text{(Equation 10)}$$

$$q_{w_a} = q_{w_b} \times \frac{\max_{w_b}}{\max_{w_a}} \quad \text{(Equation 11)}$$

Generally, in equations 8-11, $x_b$ corresponds to the input activation tensor 205 (e.g., before transformation), $\max_{x_b}$ corresponds to the maximum value in the input activation tensor 205, $w_b$ corresponds to the weight tensor 206 (before transformation), and $\max_{w_b}$ corresponds to the maximum value in the weight tensor 206. Furthermore, in equations 8-11, $x_a$ corresponds to the transformed input activation tensor 209, $q_{x_a}$ corresponds to the scale factor for the transformed input activation tensor 209, $w_a$ corresponds to the transformed weight tensor 210, and $q_{w_a}$ corresponds to the scale factor for the transformed weight tensor 210. Therefore, in equation 8, the transformed input activation tensor 209 is determined based on the input activation tensor 205 (e.g., $x_b$), the transpose of the input matrix 207 (e.g., $B^T$) and the input matrix 207 (e.g., B). In equation 9, the scale factor $q_{x_a}$ for the transformed input activation tensor 209 is determined based on the scale factor of the input activation tensor (e.g., $q_{x_b}$), the maximum value of the transformed input activation tensor 209 (e.g., $\max_{x_a}$) and the maximum value of the input activation tensor 205 (e.g., $\max_{x_b}$).

Similarly, in equation 10, the transformed weight tensor 210 (e.g., $w_a$) is determined based on the weight matrix 208 (e.g., G), the transpose of the weight matrix 208 (e.g., $G^T$) and the weight tensor 206 (e.g., $w_b$). In equation 11, the scale factor for the transformed weight tensor 210 (e.g., $q_{w_a}$) is determined based on the scale factor of the weight tensor 206 (e.g., $q_{w_b}$), the maximum value of the transformed weight tensor 210 (e.g., $\max_{w_a}$) and the maximum value of the weight tensor 206 (e.g., $\max_{w_b}$). The output of the calibration 204 is the 8-bit optimized CNN model with scale factors 211, which may correspond to an INT8 CNN model 108 of FIG. 1. The 8-bit optimized CNN model 211 includes the scale factors determined during the calibration phase 204.

The 8-bit optimized CNN model with scale factors 211 may then be used by the CW algorithm logic 102 to perform INT8 CW convolution using the CW algorithm logic 102. For example, the 8-bit optimized CNN model with scale factors 211 may be used in convolutions to classify datasets of images using the CW algorithm logic 102. Doing so may provide faster convolution processing relative to conventional techniques, without significant loss of accuracy relative to FP32-based convolutions.

Figure 3:
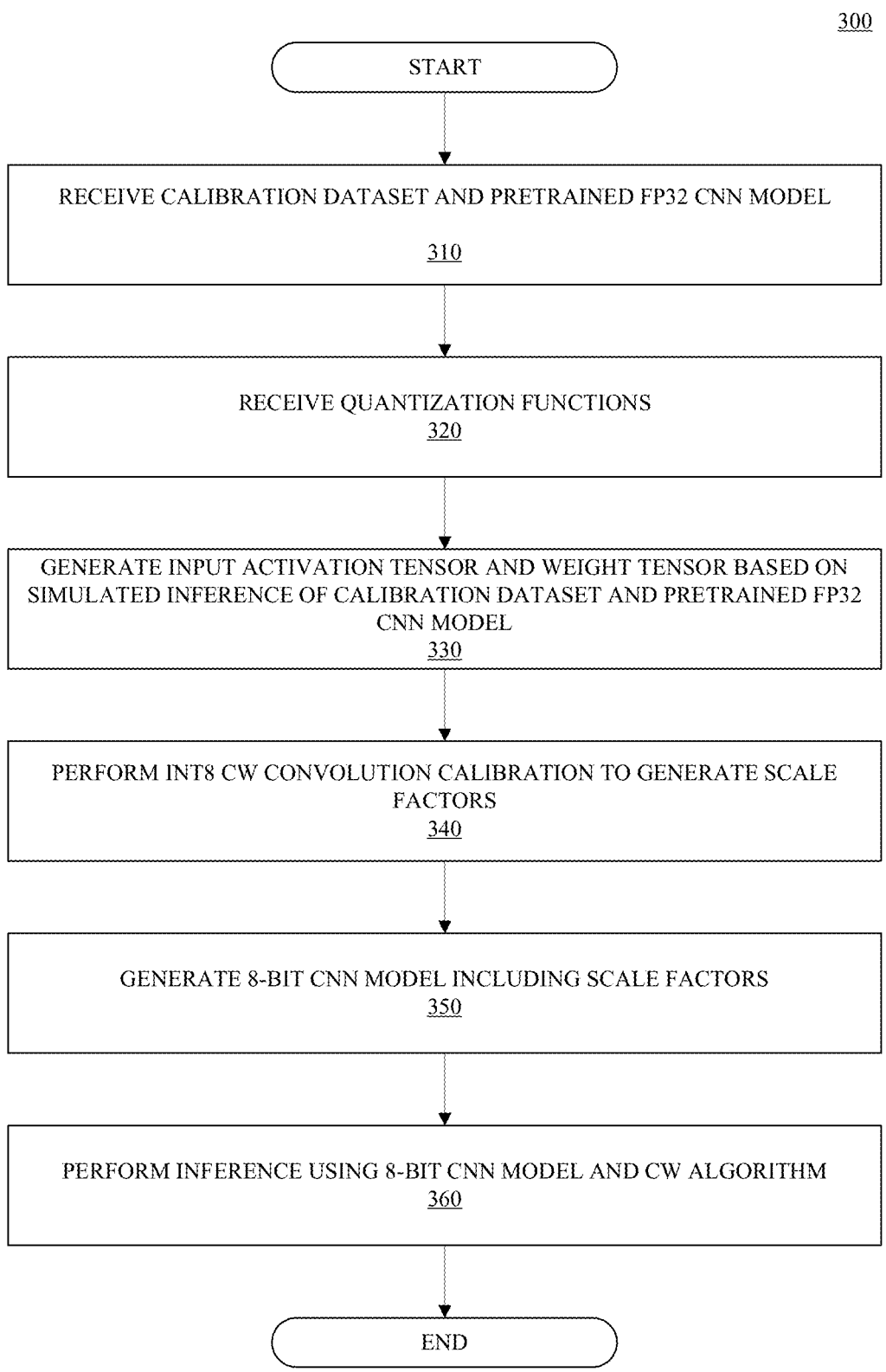
FIG. 3 illustrates an embodiment of a first logic flow.

FIG. 3 illustrates an embodiment of a logic flow 300. The logic flow 300 may be representative of some or all of the operations executed by one or more embodiments described herein. Embodiments are not limited in this context. For example, the system 100 (or components thereof) may perform the operations in logic flow 300 to use the CW algorithm logic 102 in INT8 data implementations.

In the illustrated embodiment shown in FIG. 3, the logic flow 300 may begin at block 310. At block 310 "receive calibration dataset and pretrained FP32 CNN model," the system 100 may receive a calibration dataset 201 and a CNN model with pretrained FP32 weights 202. The calibration dataset 201 may be any dataset, such as a dataset of images used to train the CNN model with pretrained FP32 weights 202 for image recognition operations. The CNN model 202 may be generated by the neural network logic 102 based on the calibration dataset 201 and/or may be received from a storage location. As stated, the CNN model 202 includes 32-bit floating point (FP32) values, e.g., for kernel weights, convolutions, etc. The FP32 kernel weights may include weights for input channels, output channels, kernel size input channel, and kernel size output channel. As stated, FP32 weights are specified in the CNN model 202 for each convolutional layer.

At block 320 "receive quantization functions," the system 100 may receive the quantization functions 104. The quantization functions 104 may include Equations 1-5 above, e.g., to quantize FP32 values to INT8 values, dequantize INT8 values to FP32 values, matrix addition functions, matrix multiplication functions, and scale factor functions. At block 330 "generate input activation tensor and weight tensor based on simulated inference of calibration dataset and pretrained FP32 CNN model", the computing system 100 generates the input activation tensor 205 and the weight tensor 206 by sampling the calibration dataset 201 and the CNN model with pretrained FP32 weights 202. For example, the neural network logic 102 may simulate the inference operation using the calibration dataset 201 and the CNN model with pretrained FP32 weights 202, and generate the input activation tensor 205 and the weight tensor 206. As stated, the input activation tensor 205 includes the input activation tensors (and output activation tensors) with FP32 values for each convolutional layer of the CNN model 202.

Similarly, the weight tensor 206 includes the weight tensor of FP32 weights for each convolutional layer of the CNN model 202.

At block 340 "perform INT8 CW convolution calibration to generate scale factors," the system 100 performs INT8 CW convolution calibration 204, e.g., based at least in part on Equations 6-12 above. The INT8 CW convolution calibration 204 includes generating the transformed input activation tensor 209 based on FP32 matrix multiplication of the input matrix 207 and the input activation tensor 205. The INT8 CW convolution calibration 204 further includes generating the transformed weight tensor 210 based on FP32 matrix multiplication of the weight matrix 208 and the weight tensor 206. The INT8 CW convolution calibration 204 further includes generating one or more scale factors for the transformed input activation tensor 209 and one or more scale factors for the transformed weight tensor 210.

At block 350 "generate 8-bit CNN model including scale factors", the system 100 generates an 8-bit (or INT8) CNN model 211 with scale factors generated at block 340. The 8-bit CNN model 211 further includes input activation tensors, output activation tensors, and weight tensors. At block 360 "perform inference using 8-bit CNN model and CW algorithm", an inference operation may be performed using the 8-bit CNN model 211, the CW algorithm logic 102, and an input dataset. For example, the input dataset may include images depicting handwriting, and the inference operation may classify the depicted handwriting. As another example, the input dataset may include images depicting faces, and the inference operation may classify the faces (e.g., to perform facial recognition). In at least one embodiment, the 8-bit hardware accelerator 106 executes the inference operation.

Figure 4:
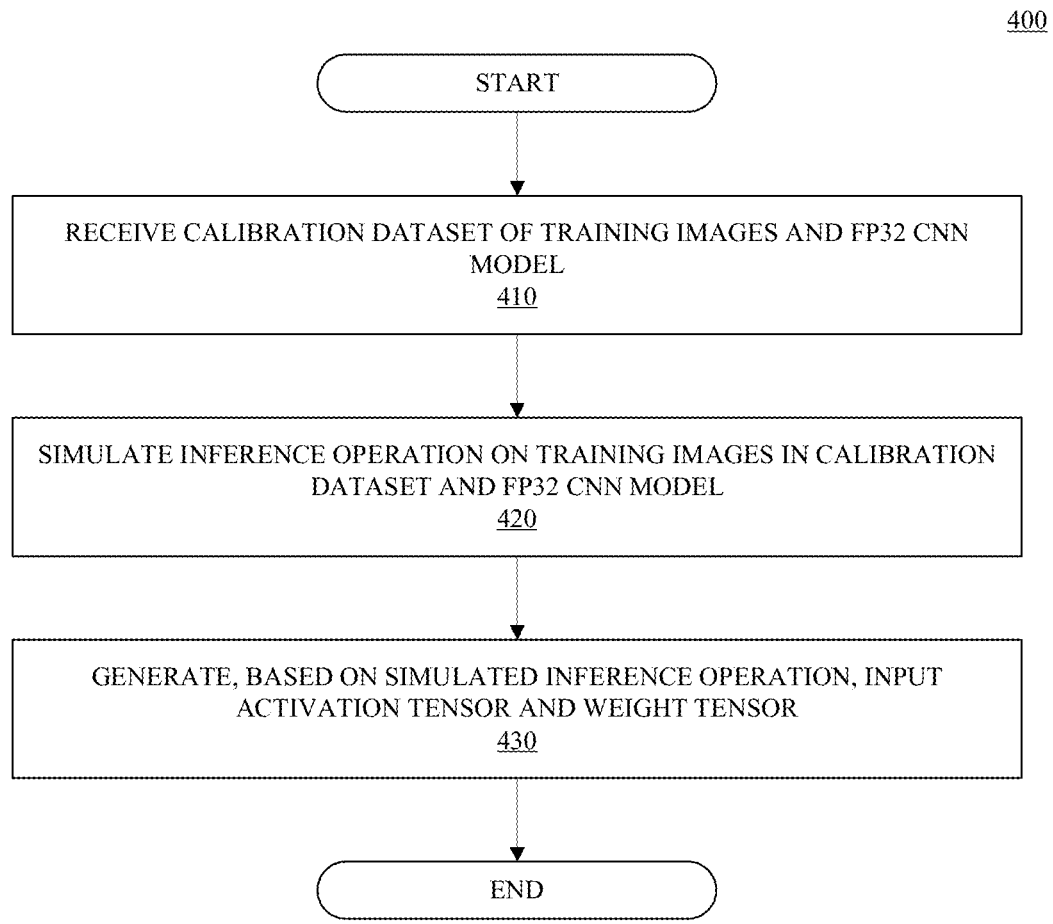
FIG. 4 illustrates an embodiment of a second logic flow.

FIG. 4 illustrates an embodiment of a logic flow 400. The logic flow 400 may be representative of some or all of the operations executed by one or more embodiments described herein. Embodiments are not limited in this context. For example, the system 100 (or components thereof) may perform the logic flow 400 to simulate an inference operation to generate the input activation tensor 205 and the weight tensor 206.

In the illustrated embodiment shown in FIG. 4, the logic flow 400 may begin at block 410. At block 410 "receive calibration dataset of training images and FP32 CNN model" the system 100 may receive the calibration dataset 201 and the CNN model with pretrained FP32 weights 202. As stated, the calibration dataset 201 may include training images. At block 410 "simulate inference operation on training images in calibration dataset and FP32 CNN model" the neural network logic 101 of the system 100 may simulate an inference operation using the calibration dataset 201 and the CNN model with pretrained FP32 weights 202. At block 430 "generate, based on simulated inference operation, input activation tensor and weight tensor", the neural network logic 101 may generate the input activation tensor 205 and the weight tensor 206 based on the simulated inference operation. As stated, the input activation tensor 205 and the weight tensor 206 include FP32 values.

Figure 5:
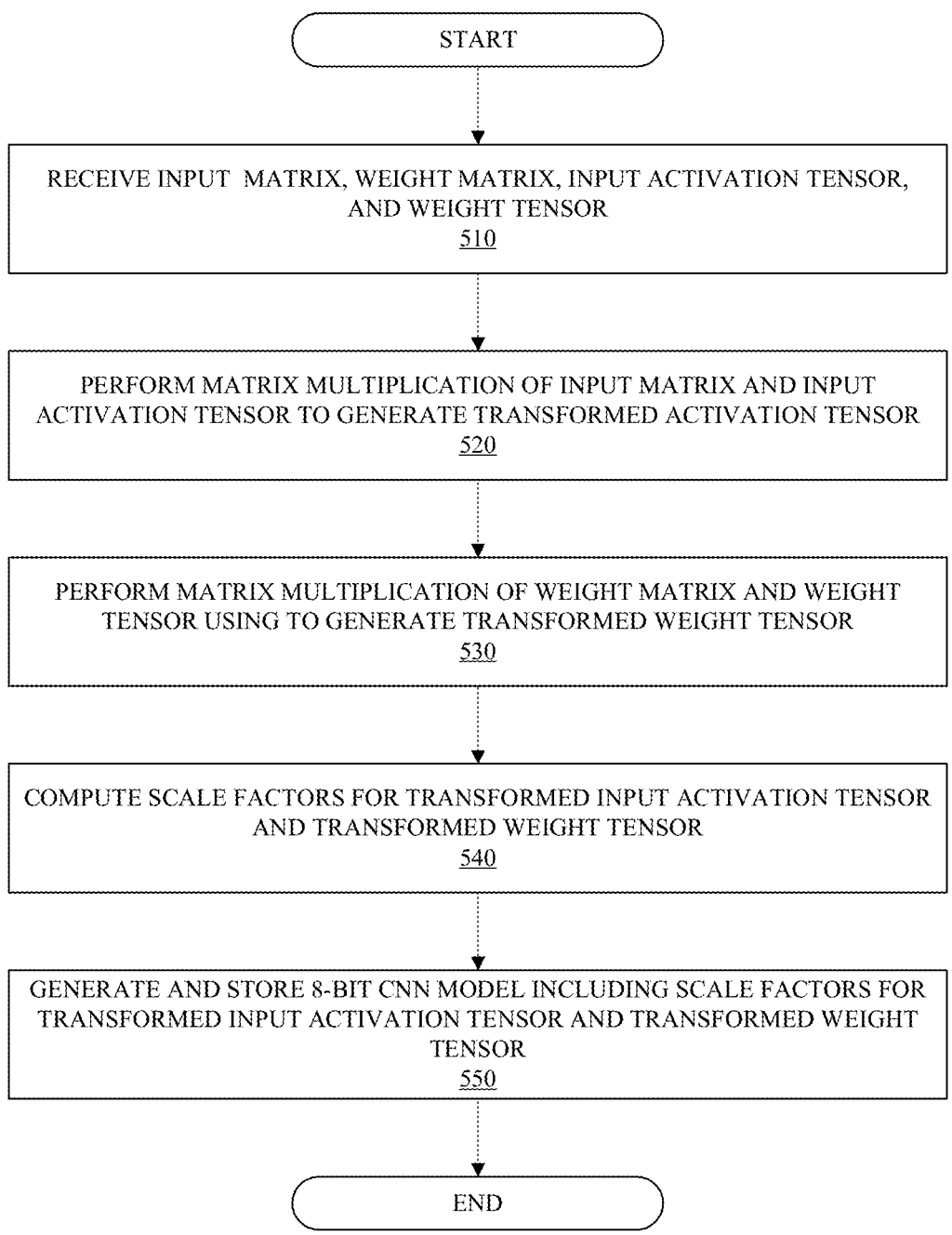
FIG. 5 illustrates an embodiment of a third logic flow.

FIG. 5 illustrates an embodiment of a logic flow 500. The logic flow 500 may be representative of some or all of the operations executed by one or more embodiments described herein. Embodiments are not limited in this context. For example, the system 100 (or a component thereof) may perform the logic flow 500 to generate an 8-bit CNN model with scale factors 211 for use in an INT8 WC convolution operation.

In the illustrated embodiment shown in FIG. 5, the logic flow 500 may begin at block 510. At block 510 "receive input matrix, weight matrix, input activation tensor, and weight tensor" the system 100 may receive the input matrix 207, the weight matrix 208, the input activation tensor 205, and the weight tensor 206. As stated, the input matrix 207 and/or the weight matrix 208 may include constant values. At block 520 "perform matrix multiplication of input matrix and input activation tensor to generate transformed activation tensor," the system 100 may perform matrix multiplication operations on the input matrix 207 and the input activation tensor 205 to generate the transformed input activation tensor 209. In at least one embodiment, the system 100 uses Equations 6 and 8 to perform the matrix multiplication operations to generate the transformed input activation tensor 209. At block 530 "perform matrix multiplication of weight matrix and weight tensor to generate transformed activation tensor," the system 100 may perform matrix multiplication operations on the weight matrix 208 and the weight tensor 206 to generate the transformed weight tensor 210. In at least one embodiment, the system 100 uses Equations 7 and 10 to perform the matrix multiplication operations to generate the transformed weight tensor 210.

At block 540 "compute scale factors for transformed input activation tensor and transformed weight tensor", the system 100 computes the scale factors for the transformed input activation tensor 209 and scale factors for the transformed weight tensor 210. In at least one embodiment, the system uses Equation 9 to compute the scale factors for the transformed input activation tensor 209. In at least one embodiment, the system uses Equation 11 to compute the scale factors for the transformed weight tensor 210. At block 550 "generate and store 8-bit CNN model including scale factors for transformed input activation tensor and transformed weight tensor" the system 100 generates the 8-bit optimized CNN model with scale factors 211, and stores the same in a storage medium for future use. Doing so allows the system 100 (e.g., the hardware accelerator 106) to perform INT8 CW convolution operations, thereby improving system performance.

Figure 6:
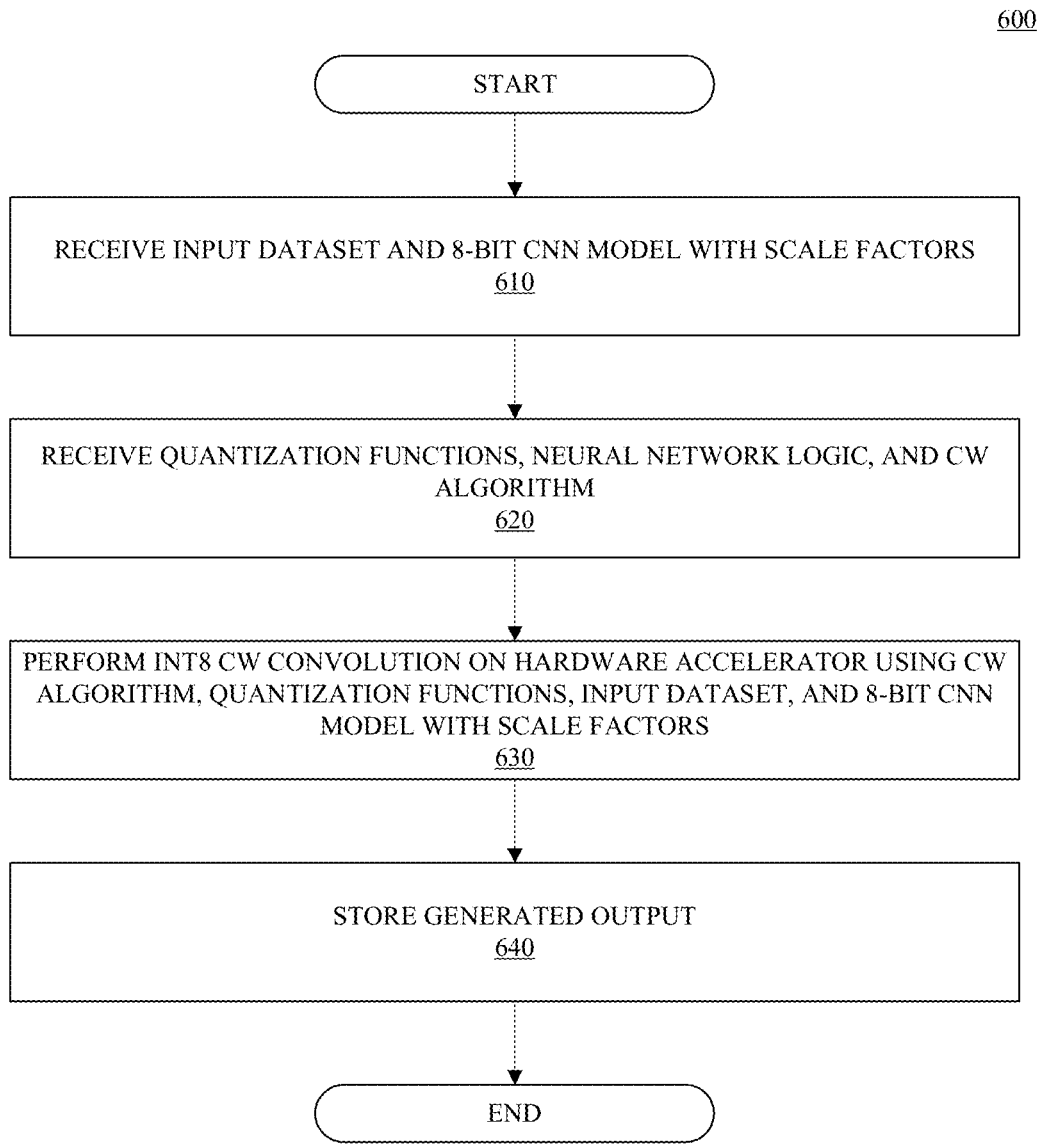
FIG. 6 illustrates an embodiment of a fourth logic flow.

FIG. 6 illustrates an embodiment of a logic flow 600. The logic flow 600 may be representative of some or all of the operations executed by one or more embodiments described herein. Embodiments are not limited in this context. For example, the system 100 may perform the logic flow 600 to perform INT8 CW convolutions on the hardware accelerator 106.

In the illustrated embodiment shown in FIG. 6, the logic flow 600 may begin at block 610. At block 610 "receive input dataset and 8-bit CNN model with scale factors", the hardware accelerator 106 may receive an input dataset (or a portion thereof) and the 8-bit optimized CNN model with scale factors 211. The input dataset may include images for classification. At block 620 "receive quantization functions, neural network logic, and CW algorithm" the hardware accelerator 106 may be configured to implement the quantization functions 104, the neural network logic 101, and the CW algorithm logic 103. At block 630 "perform int8 CW convolution on hardware accelerator using CW algorithm, quantization functions, input dataset, and 8-bit CNN model with scale factors", the neural network logic 101 executing on the hardware accelerator 106 may perform the INT8 CW convolution operation for the input dataset and the 8-bit optimized CNN model with scale factors 211. As stated, the inference operation may be based at least in part on Equations 1-5. At block 640 "store generated output" the output of the inference operation (e.g., classified images) may be stored in a storage medium. Similarly, the output may be presented to a user via a display.

Figure 7:
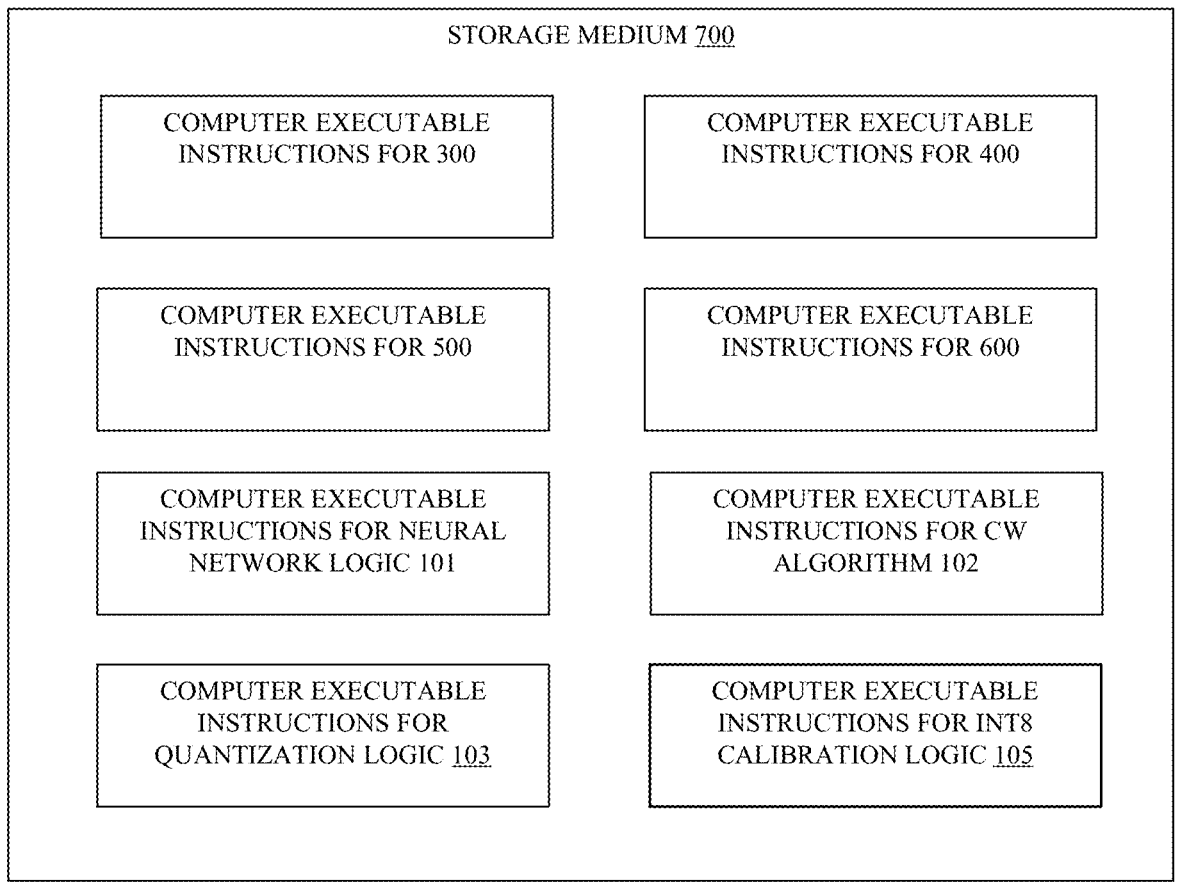
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to 300, 400, 500, 600 of FIGS. 3-6. The storage medium 700 may further store computer-executable instructions for the neural network logic 101, the CW algorithm 201, the quantization logic 103, and the INT8 calibration logic 105. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
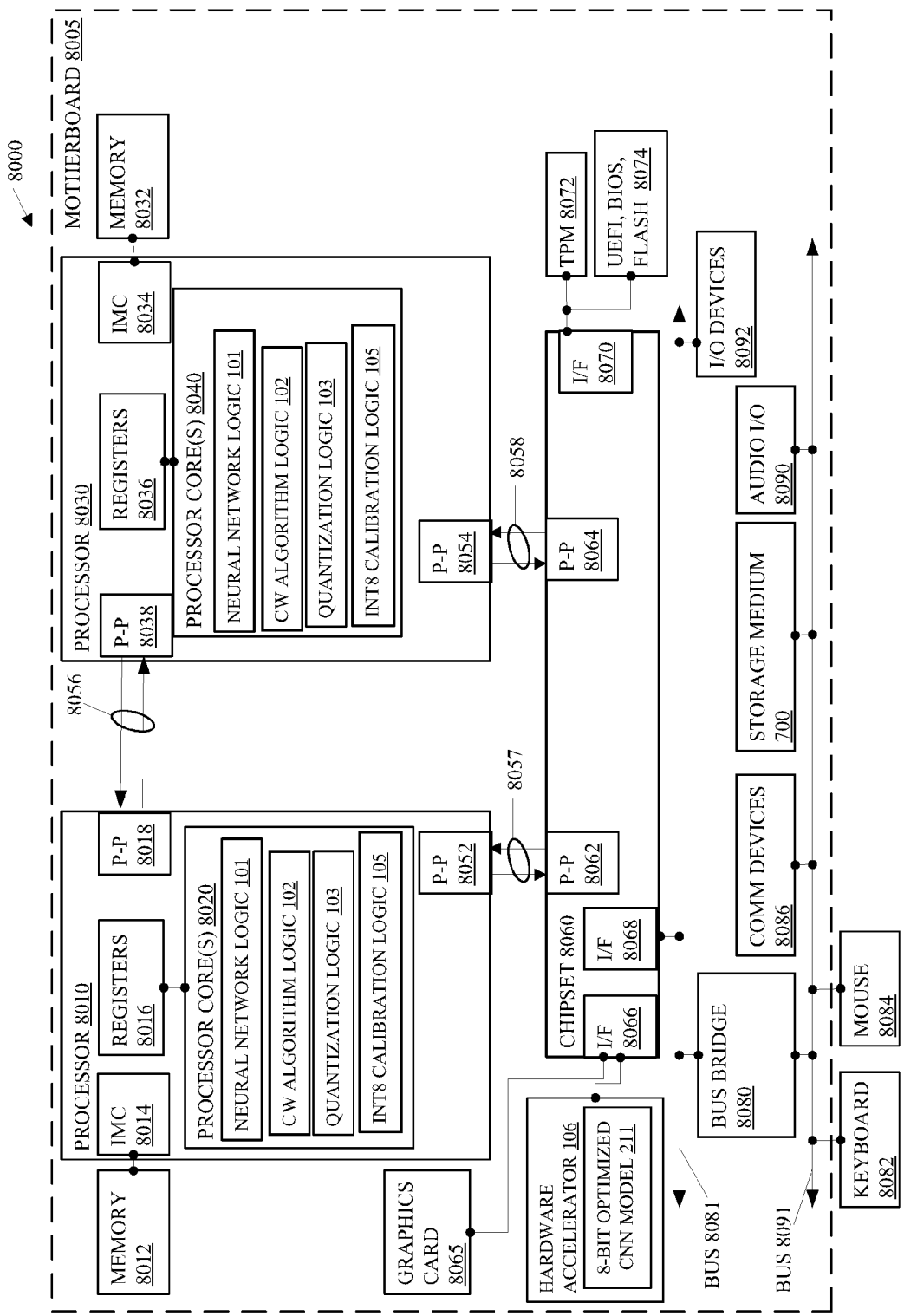
FIG. 8 illustrates an embodiment of a system.

FIG. 8 illustrates an embodiment of a system 8000. The system 8000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 8000 may have a single processor with one core or more than one processor. Note that the term "processor" refers to a processor with a single core or a processor package with multiple processor cores. In at least one embodiment, the computing system 8000 is representative of the system 100. More generally, the computing system 8000 is configured to implement all logic, systems, logic flows, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary system 8000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 8, system 8000 comprises a motherboard 8005 for mounting platform components. The motherboard 8005 is a point-to-point interconnect platform that includes a first processor 8010 and a second processor 8030 coupled via a point-to-point interconnect 8056 such as an Ultra Path Interconnect (UPI). In other embodiments, the system 8000 may be of another bus architecture, such as a multi-drop bus. Furthermore, each of processors 8010 and 8030 may be processor packages with multiple processor cores including processor core(s) 8020 and 8040, respectively. While the system 8000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 8010 and the chipset 8060. Some platforms may include additional components and some platforms may only include sockets to mount the processors and/or the chipset.

The processors 8010, 8020 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processors 8010, 8020.

The first processor 8010 includes an integrated memory controller (IMC) 8014 and point-to-point (P-P) interfaces 8018 and 8052. Similarly, the second processor 8030 includes an IMC 8034 and P-P interfaces 8038 and 8054. The IMC's 8014 and 8034 couple the processors 8010 and 8030, respectively, to respective memories, a memory 8012 and a memory 8032. The memories 8012 and 8032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 8012 and 8032 locally attach to the respective processors 8010 and 8030. In other embodiments, the main memory may couple with the processors via a bus and shared memory hub.

The processors 8010 and 8030 comprise caches coupled with each of the processor core(s) 8020 and 8040, respectively. In the present embodiment, the processor core(s) 8020 of the processor 8010 and the processor core(s) 8040 of processor 830 include the neural network logic 101, the CW algorithm logic 102, the quantization logic 103, and the INT8 calibration logic 105. The processor cores 8020, 840 may further memory management logic circuitry (not pictured) which may represent circuitry configured to implement the functionality of the neural network logic 101, the CW algorithm logic 102, the quantization logic 103, and the INT8 calibration logic 105 in the processor core(s) 8020, 8040, or may represent a combination of the circuitry within a processor and a medium to store all or part of the functionality of the neural network logic 101, the CW algorithm logic 102, the quantization logic 103, and the INT8 calibration logic 105 in memory such as cache, the memory 8012, buffers, registers, and/or the like. In several embodiments, the functionality of the neural network logic 101, the CW algorithm logic 102, the quantization logic 103, and the INT8 calibration logic 105 resides in whole or in part as code in a memory such as the storage medium 700 attached to the processors 8010, 830 via a chipset 8060. The functionality of the neural network logic 101, the CW algorithm logic 102, the quantization logic 103, and the INT8 calibration logic 105 may also reside in whole or in part in memory such as the memory 8012 and/or a cache of the processor. Furthermore, the functionality of the neural network logic 101, the CW algorithm logic 102, the quantization logic 103, and the INT8 calibration logic 105 may also reside in whole or in part as circuitry within the processor 8010 and may perform operations, e.g., within registers or buffers such as the registers 8016 within the processors 8010, 8030, or within an instruction pipeline of the processors 8010, 8030. Further still, the functionality of the neural network logic 101, the CW algorithm logic 102, the quantization logic 103, and the INT8 calibration logic 105 may be integrated a processor of the hardware accelerator 106 for generating an 8-bit optimized CNN model 211, and performing inference operations based on the same.

As stated, more than one of the processors 8010 and 8030 may comprise functionality of the neural network logic 101, the CW algorithm logic 102, the quantization logic 103, and the INT8 calibration logic 105, such as the processor 8030 and/or a processor within the hardware accelerator 106 coupled with the chipset 8060 via an interface (I/F) 8066. The I/F 8066 may be, for example, a Peripheral Component Interconnect-enhanced (PCI-e).

The first processor 8010 couples to a chipset 8060 via P-P interconnects 8052 and 8062 and the second processor 8030 couples to a chipset 8060 via P-P interconnects 8054 and 8064. Direct Media Interfaces (DMIs) 8057 and 8058 may couple the P-P interconnects 8052 and 8062 and the P-P interconnects 8054 and 8064, respectively. The DMI may be a high-speed interconnect that facilitates, e.g., eight Giga Transfers per second (GT/s) such as DMI 3.0. In other embodiments, the processors 8010 and 8030 may interconnect via a bus.

The chipset 8060 may comprise a controller hub such as a platform controller hub (PCH). The chipset 8060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 8060 may comprise more than one controller hub such as a chipset with a memory controller hub, a graphics controller hub, and an input/output (I/O) controller hub.

In the present embodiment, the chipset 8060 couples with a trusted platform module (TPM) 8072 and the UEFI, BIOS, Flash component 8074 via an interface (I/F) 8070. The TPM 8072 is a dedicated microcontroller designed to secure hardware by integrating cryptographic keys into devices. The UEFI, BIOS, Flash component 8074 may provide pre-boot code.

Furthermore, chipset 8060 includes an I/F 8066 to couple chipset 8060 with a high-performance graphics engine, graphics card 8065. In other embodiments, the system 8000 may include a flexible display interface (FDI) between the processors 8010 and 8030 and the chipset 8060. The FDI interconnects a graphics processor core in a processor with the chipset 8060.

Various I/O devices 8092 couple to the bus 8081, along with a bus bridge 8080 which couples the bus 8081 to a second bus 8091 and an I/F 8068 that connects the bus 8081 with the chipset 8060. In one embodiment, the second bus 8091 may be a low pin count (LPC) bus. Various devices may couple to the second bus 8091 including, for example, a keyboard 8082, a mouse 8084, communication devices 8086 and the storage medium 700 that may store computer executable code as previously described herein. Furthermore, an audio I/O 8090 may couple to second bus 8091. Many of the I/O devices 8092, communication devices 8086, and the storage medium 700 may reside on the motherboard 8005 while the keyboard 8082 and the mouse 8084 may be add-on peripherals. In other embodiments, some or all the I/O devices 8092, communication devices 8086, and the storage medium 700 are add-on peripherals and do not reside on the motherboard 8005.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The following examples pertain to further embodiments, from which numerous permutations and configurations will be apparent.

Example 1 is an apparatus comprising: a processor, and a memory storing instructions which when executed by the processor cause the processor to: sample a calibration dataset and a pretrained convolutional neural network (CNN) comprising 32-bit floating point weight values to generate an input activation tensor and a weight tensor; generate a transformed input activation tensor based in part on multiplying the input activation tensor and an input matrix; generate a transformed weight tensor based in part on multiplying the weight tensor and a weight matrix; compute a scale factor for the transformed input activation tensor and a scale factor for the transformed weight tensor; and generate an 8-bit CNN model comprising the scale factors for the transformed input activation tensor and the transformed weight tensor.

Example 2 includes the subject matter of Example 1, the apparatus further comprising a hardware accelerator configured to: receive an input dataset comprising a plurality of images; and perform an 8-bit Coppersmith-Winograd (CW) convolution operation using the 8-bit CNN model and the input dataset to classify each of the plurality of images.

Example 3 includes the subject matter of Examples 1-2, the memory storing instructions for one or more quantization functions to: (i) quantize 32-bit floating point weight values to 8-bit integers, (ii) dequantize 8-bit integers to 32-bit floating point weight values, (iii) perform matrix addition operations, and (iv) perform matrix multiplication operations.

Example 4 includes the subject matter of Example 3, the quantization function to quantize 32-bit floating point weight values to 8-bit integers comprising:

$$Q(r,q,p)=Q_p(r,q)=Q_{p,q}(r)=(z,q)z=\max(\min(\text{Round}(qr), 2^p-1),-2^p),$$

where $r \in R^n, q \in R, p \in N^+, z \in Z^n, \text{Round}: R^n \rightarrow Z^n$, where Q comprises the quantization function, r comprises an n-dimensional rational tensor, and z comprises an n-dimensional rational tensor with a scale factor q and bit-precision p.

Example 5 includes the subject matter of Example 4, the quantization function to dequantize 8-bit integers to 32-bit floating point weight values comprising:

$$D(z, q) = D_q(z) = \frac{z}{q} = r' \approx r.$$

Example 6 includes the subject matter of Example 5, the quantization function to perform matrix addition operations comprising:

$$(z_1,q_1)+(z_2,q_2)=Q_p(D_{q1}(z_1)D_{q2}(z_2),\min(q_1,q_2)).$$

Example 7 includes the subject matter of Example 6, the quantization function to perform matrix multiplication operations comprising:

$$(z_1,q_1) \times (z_2,q_2)=(z_1 \times z_2, q_1 q_2).$$

Example 8 includes the subject matter of Example 7, the quantization functions further comprising a function to define a scale factor for direct CW convolution using the following equation:

$$\frac{2^p - 1}{\max},$$

where p=7 for the weight tensor, where p=8 for the activation tensor, where max comprises a maximum value in each respective tensor.

Example 9 includes the subject matter of Examples 1-8, the transformed input activation tensor computed based on the following equation:

$$x_a = B^T x_b,$$

where $x_a$ comprises a value of the transformed input activation tensor, the input matrix comprises $B^T$, and $x_b$ comprises a value of the input activation tensor.

Example 10 includes the subject matter of Example 9, where the scale factor for the transformed input activation tensor computed based on the following equation:

$$q_{w_a} = q_{w_b} \times \frac{\max_{w_b}}{\max_{w_a}},$$

where $q_{x_a}$ comprises the scale factor or the transformed input activation tensor, and $q_{x_b}$ comprises a quantized value of the input activation tensor.

Example 11 includes the subject matter of Examples 1-10, the transformed weight tensor computed based on the following equation:

$$w_a = G w_b G^T,$$

where $w_a$ comprises a value of the transformed weight tensor, the weight matrix comprises G, and $w_b$ comprises a value of the weight tensor.

Example 12 includes the subject matter of Example 11, the scale factor for the transformed weight tensor computed based on the following equation:

$$q_{x_a} = q_{x_b} \times \frac{\max_{x_b}}{\max_{x_a}},$$

where $q_{w_a}$ comprises the scale factor or the transformed weight tensor, and $q_{w_b}$ comprises a quantized value of the weight tensor.

Example 13 is a method, comprising: sampling a calibration dataset and a pretrained convolutional neural network (CNN) comprising 32-bit floating point weight values to generate an input activation tensor and a weight tensor; generating a transformed input activation tensor based in part on multiplying the input activation tensor and an input matrix; generating a transformed weight tensor based in part on multiplying the weight tensor and a weight matrix; computing a scale factor for the transformed input activation tensor and a scale factor for the transformed weight tensor; and generating, by operation of a computer processor, an 8-bit CNN model comprising the scale factors for the transformed input activation tensor and the transformed weight tensor.

Example 14 includes the subject matter of Example 13, further comprising: receiving an input dataset comprising a plurality of images; and performing, by a hardware accelerator comprising a processor, an 8-bit Coppersmith-Winograd (CW) convolution operation using the 8-bit CNN model and the input dataset to classify each of the plurality of images.

Example 15 includes the subject matter of Examples 13-14, further comprising one or more quantization functions to: (i) quantize 32-bit floating point weight values to 8-bit integers, (ii) dequantize 8-bit integers to 32-bit floating point weight values, (iii) perform matrix addition operations, and (iv) perform matrix multiplication operations.

Example 16 includes the subject matter of Example 15, the quantization function to quantize 32-bit floating point weight values to 8-bit integers comprising:

$$Q(r,q,p)=Q_p(r,q)=Q_{p,q}(r)=(z,q)z=\max(\min(\text{Round}(qr), 2^p-1), -2^p),$$

where $r \in R^n, q \in R, p \in N^+, z \in Z^n,$ Round: $R^n \to Z^n$, where Q comprises the quantization function, r comprises an n-dimensional rational tensor, and z comprises an n-dimensional rational tensor with a scale factor q and bit-precision p.

Example 17 includes the subject matter of Example 16, the quantization function to dequantize 32-bit floating point weight values to 8-bit integers comprising:

$$D(z, q) = D_q(z) = \frac{z}{q} = r' \approx r.$$

Example 18 includes the subject matter of Example 17, the quantization function to perform matrix addition operations comprising:

$$(z_1,q_1)+(z_2,q_2)=Q_p(D_{q1}(z_1)+D_{q2}(z_2),\min(q_1,q_2)).$$

Example 19 includes the subject matter of Example 18, the quantization function to perform matrix multiplication operations comprising:

$$(z_1,q_1) \times (z_2,q_2)=(z_1 \times z_2, q_1 q_2).$$

Example 20 includes the subject matter of Example 19, the quantization functions further comprising a function to define a scale factor for direct CW convolution using the following equation:

$$\frac{2^p - 1}{\max},$$

where p=7 for the weight tensor, where p=8 for the activation tensor, where max comprises a maximum value in each respective tensor.

Example 21 includes the subject matter of Examples 1-20, the transformed input activation tensor computed based on the following equation:

$$x_a = B^T x_b,$$

where $x_a$ comprises a value of the transformed input activation tensor, the input matrix comprises $B^T$, and $x_b$ comprises a value of the input activation tensor.

Example 22 includes the subject matter of Example 21, the scale factor for the transformed input activation tensor computed based on the following equation:

$$q_{x_a} = q_{x_b} \times \frac{\max_{x_b}}{\max_{x_a}},$$

where $q_{x_a}$ comprises the scale factor or the transformed input activation tensor, and $q_{x_b}$ comprises a quantized value of the input activation tensor.

Example 23 includes the subject matter of Example 22, the transformed weight tensor computed based on the following equation:

$$w_a = G w_b G^T,$$

where $w_a$ comprises a value of the transformed weight tensor, the weight matrix comprises G, and $w_b$ comprises a value of the weight tensor.

Example 24 includes the subject matter of Example 23, the scale factor for the transformed weight tensor computed based on the following equation:

$$q_{w_a} = q_{w_b} \times \frac{\max_{w_b}}{\max_{w_a}},$$

where $q_{w_a}$ comprises the scale factor or the transformed weight tensor, and $q_{w_b}$ comprises a quantized value of the weight tensor.

Example 25 is a non-transitory computer-readable storage medium comprising instructions that when executed by a computing device, cause the computing device to: sample a calibration dataset and a pretrained convolutional neural network (CNN) comprising 32-bit floating point weight values to generate an input activation tensor and a weight tensor; generate a transformed input activation tensor based in part on multiplying the input activation tensor and an input matrix; generate a transformed weight tensor based in part on multiplying the weight tensor and a weight matrix; compute a scale factor for the transformed input activation tensor and a scale factor for the transformed weight tensor; and generate an 8-bit CNN model comprising the scale factors for the transformed input activation tensor and the transformed weight tensor.

Example 26 includes the subject matter of Example 25, further comprising instructions executable by the computing device to cause the computing device to: receive an input dataset comprising a plurality of images; and perform, by a hardware accelerator, the 8-bit CW convolution operation using the 8-bit CNN model and the input dataset to classify each of the plurality of images.

Example 27 includes the subject matter of Examples 25-26, further comprising instructions for one or more quantization functions executable by the computing device to cause the computing device to: (i) quantize 32-bit floating point weight values to 8-bit integers, (ii) dequantize 8-bit integers to 32-bit floating point weight values, (iii) perform matrix addition operations, and (iv) perform matrix multiplication operations.

Example 28 includes the subject matter of Example 27, he quantization function to quantize 32-bit floating point weight values to 8-bit integers comprising:

$$Q(r, q, p) = Q_p(r, q) = Q_{p,q}(r) = (z, q)z = \max(\min(\text{Round}(qr), 2^p-1), -2^p),$$

where $r \in R^n, q \in R, p \in N^+, z \in Z^n$, Round: $R^n \to Z^n$, where Q comprises the quantization function, r comprises an n-dimensional rational tensor, and z comprises an n-dimensional rational tensor with a scale factor q and bit-precision p.

Example 29 includes the subject matter of Example 28, the quantization function to dequantize 8-bit integers to 32-bit floating point weight values comprising:

$$D(z, q) = D_q(z) = \frac{z}{q} = r' \approx r.$$

Example 30 includes the subject matter of Example 29, the quantization function to perform matrix addition operations comprising:

$$(z_1, q_1) + (z_2, q_2) = Q_p(D_{q1}(z_1) + D_{q2}(z_2), \min(q_1, q_2)).$$

Example 31 includes the subject matter of Example 30, the quantization function to perform matrix multiplication operations comprising:

$$(z_1, q_1) \times (z_2, q_2) = (z_1 \times z_2, q_1 q_2).$$

Example 32 includes the subject matter of Example 31, the quantization functions further comprising a function to define a scale factor for direct CW convolution using the following equation:

$$\frac{2^p - 1}{\max},$$

where p=7 for the weight tensor, where p=8 for the activation tensor, where max comprises a maximum value in each respective tensor.

Example 33 includes the subject matter of Examples 25-31, the transformed input activation tensor computed based on the following equation:

$$x_a = B^T x_b,$$

where $x_a$ comprises a value of the transformed input activation tensor, the input matrix comprises $B^T$, and $x_b$ comprises a value of the input activation tensor.

Example 34 includes the subject matter of Example 33, where the scale factor for the transformed input activation tensor computed based on the following equation:

$$q_{w_a} = q_{w_b} \times \frac{\max_{w_b}}{\max_{w_a}},$$

where $q_{x_a}$ comprises the scale factor or the transformed input activation tensor, and $q_{x_b}$ comprises a quantized value of the input activation tensor.

Example 35 includes the subject matter of Examples 25-34, the transformed weight tensor computed based on the following equation:

$$w_a = G w_b G^T,$$

where $w_a$ comprises a value of the transformed weight tensor, the weight matrix comprises G, and $w_b$ comprises a value of the weight tensor.

Example 36 includes the subject matter of Example 35, the scale factor for the transformed weight tensor computed based on the following equation:

$$q_{w_a} = q_{w_b} \times \frac{\max_{w_b}}{\max_{w_a}},$$

where $q_{w_a}$ comprises the scale factor or the transformed weight tensor, and $q_{w_b}$ comprises a quantized value of the weight tensor.

Example 37 is an apparatus comprising means for sampling a calibration dataset and a pretrained convolutional neural network (CNN) comprising 32-bit floating point weight values to generate an input activation tensor and a weight tensor; means for generating a transformed input activation tensor based in part on multiplying the input activation tensor and an input matrix; means for generating a transformed weight tensor based in part on multiplying the weight tensor and a weight matrix; means for computing a scale factor for the transformed input activation tensor and a scale factor for the transformed weight tensor; and means for generating an 8-bit CNN model comprising the scale factors for the transformed input activation tensor and the transformed weight tensor.

Example 38 includes the subject matter of Example 37, further comprising: means for a hardware accelerator; means for receiving an input dataset comprising a plurality of images; and means for performing, by the hardware accelerator, an 8-bit Coppersmith-Winograd (CW) convolution operation using the 8-bit CNN model and the input dataset to classify each of the plurality of images.

Example 39 includes the subject matter of Examples 37-38, further comprising means for quantization functions to: (i) quantize 32-bit floating point weight values to 8-bit integers, (ii) dequantize 8-bit integers to 32-bit floating point weight values, (iii) perform matrix addition operations, and (iv) perform matrix multiplication operations.

Example 40 includes the subject matter of Example 39, further comprising means for quantizing 32-bit floating point weight values to 8-bit integers according to the following equation:

$$Q(r,q,p) = Q_p(r,q) = Q_{p,q}(r) = (z,q)z = \max(\min(\text{Round}(qr), 2^p-1), -2^p),$$

where $r \in R^n, q \in R, p \in N^+, z \in Z^n$, Round: $R^n \to Z^n$, where Q comprises the quantization function, r comprises an n-dimensional rational tensor, and z comprises an n-dimensional rational tensor with a scale factor q and bit-precision p.

Example 41 includes the subject matter of Example 40, further comprising means for dequantizing 8-bit integers to 32-bit floating point weight values according to the following equation:

$$D(z, q) = D_q(z) = \frac{z}{q} = r' \approx r.$$

Example 42 includes the subject matter of Example 41, further comprising means for performing matrix addition operations according to the following equation:

$$(z_1,q_1)+(z_2,q_2)=Q_p(D_{q1}(z_1)+D_{q2}(z_2),\min(q_1,q_2)).$$

Example 43 includes the subject matter of Example 42, further comprising means for performing matrix multiplication operations according to the following equation:

$$(z_1,q_1)\times(z_2,q_2)=(z_1\times z_2,q_1q_2).$$

Example 44 includes the subject matter of Example 43, further comprising means for defining a scale factor for direct CW convolution according to the following equation:

$$\frac{2^p-1}{\max},$$

where p=7 for the weight tensor, where p=8 for the activation tensor, where max comprises a maximum value in each respective tensor.

Example 45 includes the subject matter of Examples 37-44, further comprising means for computing the transformed input activation tensor according to the following equation:

$$x_a=B^T x_b,$$

where $x_a$ comprises a value of the transformed input activation tensor, the input matrix comprises $B^T$, and $x_b$ comprises a value of the input activation tensor.

Example 46 includes the subject matter of Example 45, further comprising means for computing the scale factor for the transformed input activation tensor according to the following equation:

$$q_{x_a} = q_{x_b} \times \frac{\max_{x_b}}{\max_{x_a}},$$

where $q_{x_a}$ comprises the scale factor or the transformed input activation tensor, and $q_{x_b}$ comprises a quantized value of the input activation tensor.

Example 47 includes the subject matter of Examples 37-46, further comprising means for computing the transformed weight tensor according to the following equation:

$$w_a=Gw_b G^T,$$

where $w_a$ comprises a value of the transformed weight tensor, the weight matrix comprises G, and $w_b$ comprises a value of the weight tensor.

Example 48 includes the subject matter of Example 47, further comprising means for computing the scale factor for the transformed weight tensor according to the following equation:

$$q_{w_a} = q_{w_b} \times \frac{\max_{w_b}}{\max_{w_a}},$$

where $q_{w_a}$ comprises the scale factor or the transformed weight tensor, and $q_{w_b}$ comprises a quantized value of the weight tensor.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
   a processor; and
   a memory storing instructions which when executed by the processor cause the processor to:
   input an image into a neural network,
   obtain an input activation tensor of a convolutional layer in the neural network based on the image and obtain a weight tensor of the convolutional layer, wherein the convolutional layer has a convolution of a floating-point data type, wherein values in the input activation tensor and the weight tensor have the floating-point data type,
   generate a transformed input activation tensor by transforming the input activation tensor with a first constant matrix, one or more values in the transformed input activation tensor having an integer data type,
   generate a transformed weight tensor by transforming the weight tensor with a second constant matrix, one or more values in the transformed weight tensor having the integer data type,
   compute scale factors from the transformed input activation tensor and the transformed weight tensor,
   perform a convolution of the integer data type, in lieu of the convolution of the floating-point type, on the transformed input activation tensor and the transformed weight tensor, wherein the convolution of the integer data type is performed by an algorithm logic unit of the floating-point data type based on the scaled factors, and
   generate a classification label of the image based on a result of the convolution of the integer data type, the classification label indicating recognition of an object in the image.

2. The apparatus of claim 1, wherein the algorithm logic unit is implemented in a hardware accelerator configured to:
   execute the convolutional layer by performing an 8-bit Coppersmith-Winograd (CW) convolution operation on the transformed input activation tensor and the transformed weight tensor.

3. The apparatus of claim 1, wherein the memory stores instructions for one or more quantization functions to: (i) quantize 32-bit floating point weight values to 8-bit integers, (ii) dequantize 8-bit integers to 32-bit floating point weight values, (iii) perform matrix addition operations, and (iv) perform matrix multiplication operations.

4. The apparatus of claim 3, wherein the quantization function to quantize 32-bit floating point weight values to 8-bit integers comprises:

$$Q(r,q,p)=Q_p(r,q)=Q_{p,q}(r)=(z,q)z=\max(\min(\mathrm{Round}(qr), 2^p-1),-2^p),$$

where $r \in R^n, q \in R, p \in N^+, z \in Z^n$, Round: $R^n \to Z^n$, where Q comprises the quantization function, r comprises an n-dimensional rational tensor, and z comprises an n-dimensional rational tensor with a scale factor q and bit-precision p.

5. The apparatus of claim 4, wherein the quantization function to dequantize 8-bit integers to 32-bit floating point weight values comprises:

$$D(z, q) = D_q(z) = \frac{z}{q} = r' \approx r.$$

6. The apparatus of claim 5, wherein the quantization function to perform matrix addition operations comprises:

$$(z_1,q_1)+(z_2,q_2)=Q_p(D_{q1}(z_1)+D_{q2}(z_2),\min(q_1,q_2)).$$

7. The apparatus of claim 6, wherein the quantization function to perform matrix multiplication operations comprises:

$$(z_1,q_1)\times(z_2,q_2)=(z_1\times z_2,q_1q_2).$$

8. The apparatus of claim 7, wherein the quantization functions further comprise a function to define a scale factor for direct Coppersmith-Winograd (CW) convolution using the following equation:

$$\frac{2^p - 1}{\max},$$

where p=7 for the weight tensor, where p=8 for the input activation tensor, where max comprises a maximum value in each respective tensor.

9. The apparatus of claim 1, wherein the transformed input activation tensor is computed based on the following equation:

$$x_a = B^T x_b,$$

where $x_a$ comprises a value of the transformed input activation tensor, the first constant matrix comprises $B^T$, and $x_b$ comprises a value of the input activation tensor.

10. The apparatus of claim 9, wherein a scale factor for the transformed input activation tensor is computed based on the following equation:

$$q_{x_a} = q_{x_b} \times \frac{\max_{x_b}}{\max_{x_a}},$$

where $q_{x_a}$ comprises the scale factor for the transformed input activation tensor, $\max_{x_b}$ corresponds to a maximum value in the input activation tensor, $\max_{x_a}$ corresponds to a maximum value transformed input activation tensor, and $q_{x_b}$ comprises a quantized value of the input activation tensor.

11. The apparatus of claim 1, wherein the transformed weight tensor is computed based on the following equation:

$$w_a = G w_b G^T,$$

where $w_a$ comprises a value of the transformed weight tensor, the second constant matrix comprises G, $G^T$ is a transpose of the second constant matrix, and $w_b$ comprises a value of the weight tensor.

12. The apparatus of claim 11, wherein a scale factor for the transformed weight tensor is computed based on the following equation:

$$q_{w_a} = q_{w_b} \times \frac{\max_{w_b}}{\max_{w_a}},$$

where $q_{w_a}$ comprises the scale factor for the transformed weight tensor, $\max_{w_b}$ corresponds to a maximum value in the weight tensor, $\max_{w_a}$ corresponds to a maximum value transformed weight tensor, and $q_{w_b}$ comprises a quantized value of the weight tensor.

13. A method, comprising:
inputting an image into a neural network;
obtaining an input activation tensor of a convolutional layer in the neural network based on the image and obtaining a weight tensor of the convolutional layer, wherein the convolutional layer has a convolution of a floating-point data type, wherein values in the input activation tensor and the weight tensor have the floating-point data type;
generating a transformed input activation tensor by transforming the input activation tensor with a first constant matrix, one or more values in the transformed input activation tensor having an integer data type;
generating a transformed weight tensor by transforming the weight tensor with a second constant matrix, one or more values in the transformed weight tensor having the integer data type;
computing scale factors from the transformed input activation tensor and the transformed weight tensor;
performing a convolution of the integer data type, in lieu of the convolution of the floating-point type, on the transformed input activation tensor and the transformed weight tensor, wherein the convolution of the integer data type is performed by an algorithm logic unit of the floating-point data type based on the scaled factors; and
generating a classification label of the image based on a result of the convolution of the integer data type, the classification label indicating recognition of an object in the image.

14. The method of claim 13, wherein the convolution of the integer data type is an 8-bit Coppersmith-Winograd (CW) convolution.

15. The method of claim 13, further comprising performing one or more quantization functions to: (i) quantize 32-bit floating point weight values to 8-bit integers, (ii) dequantize 8-bit integers to 32-bit floating point weight values, (iii) perform matrix addition operations, and (iv) perform matrix multiplication operations.

16. The method of claim 15, wherein the quantization function to quantize 32-bit floating point weight values to 8-bit integers comprises:

$$Q(r,q,p)=Q_p(r,q)=Q_{p,q}(r)=(z,q)z=\max(\min(\text{Round}(qr),2^p-1),-2^p),$$

where $r \in R^n, q \in R, p \in N^+, z \in Z^n$, Round: $R^n \to Z^n$, where Q comprises the quantization function, r comprises an n-dimensional rational tensor, and z comprises an n-dimensional rational tensor with a scale factor q and bit-precision p.

17. The method of claim 16, wherein the quantization function to dequantize 8-bit integers to 32-bit floating point weight values comprises:

$$D(z, q) = D_q(z) = \frac{z}{q} = r' \approx r.$$

18. The method of claim 17, wherein the quantization function to perform matrix addition operations comprises:

$$(z_1,q_1)+(z_2,q_2)=Q_p(D_{q1}(z_1)+D_{q2}(z_2),\min(q_1,q_2)).$$

19. A non-transitory computer-readable storage medium comprising instructions that when executed by a computing device, cause the computing device to:
input an image into a neural network;
obtain an input activation tensor of a convolutional layer in the neural network based on the image and obtain a weight tensor of the convolutional layer, wherein the convolutional layer has a convolution of a floating-point data type, wherein values in the input activation tensor and the weight tensor have the floating-point data type;
generate a transformed input activation tensor by transforming the input activation tensor with a first constant matrix, one or more values in the transformed input activation tensor having an integer data type;
generate a transformed weight tensor by transforming the weight tensor with a second constant matrix, one or more values in the transformed weight tensor having the integer data type;
compute scale factors from the transformed input activation tensor and the transformed weight tensor;
perform a convolution of the integer data type, in lieu of the convolution of the floating-point type, on the transformed input activation tensor and the transformed weight tensor, wherein the convolution of the integer data type is performed by an algorithm logic unit of the floating-point data type based on the scaled factors; and
generate a classification label of the image based on a result of the convolution of the integer data type, the classification label indicating recognition of an object in the image.

20. The non-transitory computer-readable storage medium of claim 19, further comprising instructions executable by the computing device to cause the computing device to:
execute the convolutional layer by performing an 8-bit Coppersmith-Winograd (CW) convolution operation on the transformed input activation tensor and the transformed weight tensor.

21. The non-transitory computer-readable storage medium of claim 19, further comprising instructions executable by the computing device to cause the computing device to perform one or more quantization functions executable by the computing device to cause the computing device to: (i) quantize 32-bit floating point weight values to 8-bit integers, (ii) dequantize 8-bit integers to 32-bit floating point weight values, (iii) perform matrix addition operations, and (iv) perform matrix multiplication operations.

22. The non-transitory computer-readable storage medium of claim 21, wherein the quantization function to quantize 32-bit floating point weight values to 8-bit integers comprises:

$$Q(r,q,p)=Q_p(r,q)=Q_{p,q}(r)=(z,q)z=\max(\min(\text{Round}(qr), 2^p-1),-2^p),$$

where $r\in R^n, q\in R, p\in N^+, z\in Z^n$, Round: $R^n\rightarrow Z^n$, where Q comprises the quantization function, r comprises an n-dimensional rational tensor, and z comprises an n-dimensional rational tensor with a scale factor q and bit-precision p.

23. The non-transitory computer-readable storage medium of claim 22, wherein the quantization function to dequantize 8-bit integers to 32-bit floating point weight values comprises:

$$D(z,q)=D_q(z)=z/q=r'\approx r.$$

24. The non-transitory computer-readable storage medium of claim 23, wherein the quantization function to perform matrix addition operations comprises:

$$(z_1, q_1)+(z_2,q_2)=Q_p(D_{q1}(z_1)+D_{q2}(z_2),\min(q_1,q_2)).$$

25. The non-transitory computer-readable storage medium of claim 24, wherein the quantization function to perform matrix multiplication operations comprises:

$$(z_1,q_1)\times(z_2,q_2)=(z_1\times z_2,q_1q_2).$$

* * * * *